(12) United States Patent
Behrens et al.

(10) Patent No.: US 9,731,681 B2
(45) Date of Patent: Aug. 15, 2017

(54) STEERING LOCK

(71) Applicant: STRATTEC Security Corporation, Milwaukee, WI (US)

(72) Inventors: Jon W. Behrens, Brookfield, WI (US); Michael D. Fink, Milwaukee, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 158 days.

(21) Appl. No.: 14/697,251

(22) Filed: Apr. 27, 2015

(65) Prior Publication Data

US 2015/0307063 A1  Oct. 29, 2015

Related U.S. Application Data

(60) Provisional application No. 61/985,829, filed on Apr. 29, 2014.

(51) Int. Cl.
| | |
|---|---|
| *B60R 25/02* | (2013.01) |
| *B60R 25/021* | (2013.01) |
| *B60R 25/0215* | (2013.01) |

(52) U.S. Cl.
CPC .......... *B60R 25/0211* (2013.01); *B60R 25/02* (2013.01); *B60R 25/0215* (2013.01); *B60R 25/02153* (2013.01)

(58) Field of Classification Search
CPC ... B60R 25/02; B60R 25/021; B60R 25/0211; B60R 25/02115; B60R 25/02118; B60R 25/02126; B60R 25/0215
See application file for complete search history.

(56) References Cited

U.S. PATENT DOCUMENTS

| | | | |
|---|---|---|---|
| 1,592,087 A | 7/1926 | Fairchild | |
| 3,859,828 A | 1/1975 | Ibuka et al. | |
| 4,773,241 A | 9/1988 | Peitsmeier et al. | |
| 6,539,756 B2 | 4/2003 | Bartels et al. | |
| 6,543,262 B2 * | 4/2003 | Limburg | B60R 25/02153 70/186 |

(Continued)

FOREIGN PATENT DOCUMENTS

| | | |
|---|---|---|
| DE | 19522508 | 6/1996 |
| DE | 19650751 | 11/1997 |

(Continued)

*Primary Examiner* — Christopher Boswell
(74) *Attorney, Agent, or Firm* — Michael Best & Friedrich LLP

(57) ABSTRACT

A steering lock locks a steering member with a lockbolt movable along an axis between locking and unlocking positions. A first member having a first cam surface is rotatable by an actuator in a first direction for locking the lockbolt. A second member having a second cam surface is engaged with the first cam surface. The second member is translatable along the axis in a locking direction by rotation of the first member. An unlocking spring is compressible through a range of movement of the second member in the first direction to store increasing potential energy. The cam surfaces are engaged such that unlocking of the lockbolt is carried out by the stored energy in the unlocking spring, which is released in a continuously increasing manner controlled by the actuator as the first member is rotated by the actuator in a second direction opposite the first direction.

28 Claims, 13 Drawing Sheets

(56) References Cited

U.S. PATENT DOCUMENTS

| | | | |
|---|---|---|---|
| 6,748,774 B2 | 6/2004 | Dubay et al. | |
| 6,915,671 B2 | 7/2005 | Zillmann | |
| 6,931,896 B2 | 8/2005 | Ochi | |
| 7,121,126 B2 | 10/2006 | Zillmann | |
| 7,363,785 B2 | 4/2008 | Limburg et al. | |
| 7,604,254 B2 * | 10/2009 | Pieronczyk | B60R 25/02153 70/184 |
| 7,823,426 B2 | 11/2010 | Okuno et al. | |
| 7,870,768 B2 * | 1/2011 | Tanioka | B60R 25/02153 70/186 |
| 8,001,814 B2 | 8/2011 | Okada et al. | |
| 8,047,028 B2 | 11/2011 | Farmer et al. | |
| 8,424,348 B2 * | 4/2013 | Dimig | B60R 25/00 70/182 |
| 8,561,442 B2 | 10/2013 | Farmer et al. | |
| 8,826,770 B2 * | 9/2014 | Inoue | B60R 25/0215 280/777 |
| 8,960,030 B2 * | 2/2015 | Asakura | B60R 25/02 70/184 |
| 9,221,427 B2 * | 12/2015 | Bodtker | B60R 25/0215 |
| 2001/0025516 A1 * | 10/2001 | Starken | B60R 25/02153 70/186 |
| 2005/0138977 A1 * | 6/2005 | Suzuki | B60R 25/02153 70/186 |

FOREIGN PATENT DOCUMENTS

| | | |
|---|---|---|
| DE | 10017032 | 4/2000 |
| EP | 0240724 | 5/1996 |
| EP | 0669234 | 11/1997 |
| EP | 1176065 | 7/2004 |
| EP | 1182103 | 4/2005 |
| EP | 2070781 | 2/2011 |
| GB | 0331611 | 7/1930 |
| GB | 1541388 | 11/1979 |
| GB | 2057555 | 4/1981 |
| WO | 2009121895 | 10/2009 |

* cited by examiner

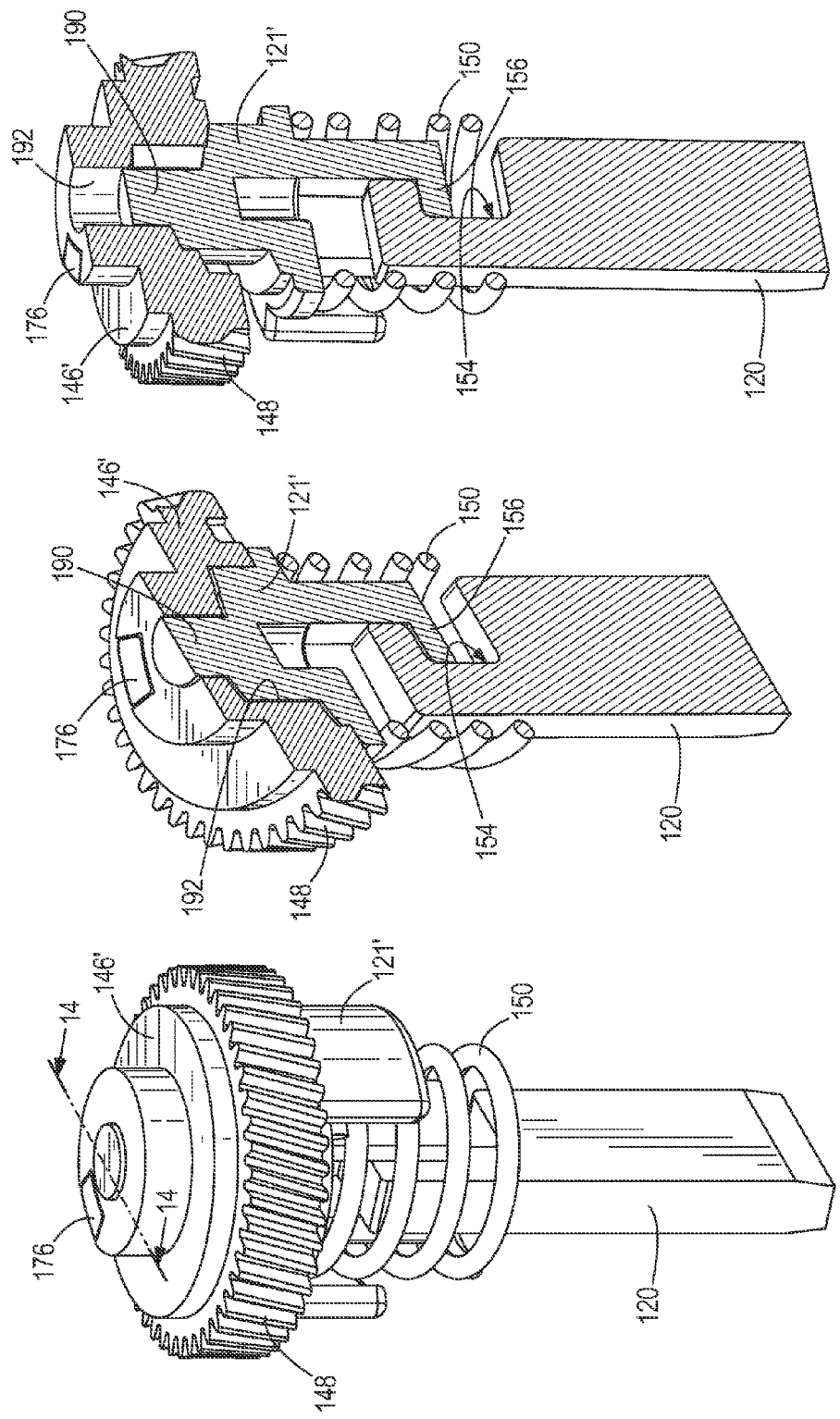

STEERING LOCK

CROSS-REFERENCE TO RELATED APPLICATIONS

This application claims priority to U.S. Provisional Patent Application No. 61/985,829, filed Apr. 29, 2014, the entire contents of which are incorporated by reference herein.

BACKGROUND

The present invention relates to locking mechanisms for locking (i.e., preventing unauthorized rotation of) a rotary steering member such as a steering wheel, handlebar, etc. of a vehicle.

Conventional steering column locks use an actuator mechanism to drive a locking pin into and out of locking engagement with a steering shaft. Efficient transfer of motion can be accomplished by directly driving the locking pin back and forth. However, certain circumstances may arise in which the locking pin becomes substantially wedged against one of the recesses in the steering shaft. In order to account for this occurrence, the electric motor that drives the locking pin and the corresponding electric drive circuit for the motor must have current/power ratings substantially higher than what is required for normal operation (when the locking pin is not wedged). Also, complex gear reduction devices may be implemented in order to multiply the torque output of the motor. In either case, the locking device as a whole becomes more costly and complicated, and may generate excessive noise. Complicated control procedures may be used by a steering lock controller to make multiple attempts, and in some cases alter the drive signal to the electric motor, if it is determined that the motor has not successfully released the locking pin upon the initial attempt.

SUMMARY

In one aspect, the invention provides a steering lock for selectively inhibiting rotation of a rotary steering member having a rib. The steering lock includes a lockbolt movable along a first axis between a steering member-locking position, in which a distal tip of the lockbolt is positioned in interference with the rib, and a steering member-unlocking position, in which the distal tip of the lockbolt is positioned out of interference with the rib. An actuator is powered to drive the lockbolt to the steering member-locking position against the bias of a steering member-unlocking spring. To unlock the steering member, the actuator is reversed to allow the steering member-unlocking spring to drive the lockbolt from the steering member-locking position to the steering member-unlocking position.

In one aspect, the invention provides a steering lock for selectively inhibiting rotation of a rotary steering member. The steering lock includes a housing, a lockbolt, and an actuator. The lockbolt is movable along a first axis between a steering member-locking position, in which a distal tip of the lockbolt is extended from the housing for engagement with the rotary steering member, and a steering member-unlocking position, in which the lockbolt is retracted with respect to the steering member-locking position. A first member is rotatable by the actuator in a first direction for movement of the lockbolt to the steering member-locking position. The first member has a first cam surface. A second member has a second cam surface in engagement with the first cam surface of the first member. The second member is translatable along the first axis in a first, locking direction in response to rotation of the first member in the first direction. An unlocking spring is compressible through a range of movement of the second member in the first direction to store increasing potential energy. The first and second cam surfaces are engaged such that movement of the lockbolt to the steering member-unlocking position is carried out by the stored energy in the unlocking spring, which is released in a continuously increasing manner controlled by the actuator as the first member is rotated by the actuator in a second direction opposite the first direction.

In one aspect, the invention provides a steering lock for selectively inhibiting rotation of a rotary steering member. The steering lock includes a housing, a lockbolt, and an actuator operable to rotate a worm. The lockbolt is movable along a first axis in a locking direction from a steering member-unlocking position, in which the lockbolt is retracted away from the rotary steering member to a steering member-locking position, in which a distal tip of the lockbolt is extended from the housing for engagement with the rotary steering member. A worm gear has teeth engaged with the worm such that the worm gear is rotatable by the actuator when powered. The worm gear has a first cam surface. A carrier is engaged with the lockbolt for movement with the lockbolt between the steering member-locking position and the steering member-unlocking position. The carrier has a second cam surface in engagement with the first cam surface of the worm gear such that the carrier is only drivable by the worm gear in the locking direction. An unlocking spring is operable to maintain stored potential energy when in the steering member-locking position for moving the lockbolt to the steering member-unlocking position. The potential energy stored by the unlocking spring urges the carrier in an unlocking direction, and the engagement between the worm and the teeth of the worm gear resists the potential energy stored by the unlocking spring to hold the lockbolt in the steering member-locking position when the actuator is at rest.

In one aspect, the invention provides a steering lock for selectively inhibiting rotation of a rotary steering member. The steering lock includes a housing, a lockbolt, and an actuator. The lockbolt is movable along a first axis between a steering member-locking position, in which a distal tip of the lockbolt is extended from the housing for engagement with the rotary steering member, and a steering member-unlocking position, in which the lockbolt is retracted with respect to the steering member-locking position. A first member is rotatable by the actuator in a first direction for movement of the lockbolt to the steering member-locking position. The first member has a first cam surface. A second member has a second cam surface in engagement with the first cam surface of the first member. The second member is translatable along the first axis in a first, locking direction in response to rotation of the first member in the first direction. An unlocking spring is compressible through a range of movement of the second member in the first direction to store increasing potential energy. A locking spring biases the lockbolt in the locking direction. The lockbolt is movable by the bias of the locking spring from the steering member-unlocking position to the steering member-locking position as the second member compresses the unlocking spring during rotation of the first member in the first direction. The first and second cam surfaces are engaged such that movement of the lockbolt to the steering member-unlocking position is carried out by the stored energy in the unlocking spring, which is released in a continuously increasing manner controlled by the actuator as the first member is rotated by the actuator in a second direction opposite the first direction.

Other aspects of the invention will become apparent by consideration of the detailed description and accompanying drawings.

BRIEF DESCRIPTION OF THE DRAWINGS

FIG. 13 is a perspective view of a lockbolt actuation mechanism according to another construction.

FIG. 14 is a cross-sectional view of the lockbolt actuation mechanism, taken along line 14-14 of FIG. 13.

FIG. 15 is a cross-sectional view of the lockbolt actuation mechanism similar to FIG. 14, but illustrating an alternate positional state.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
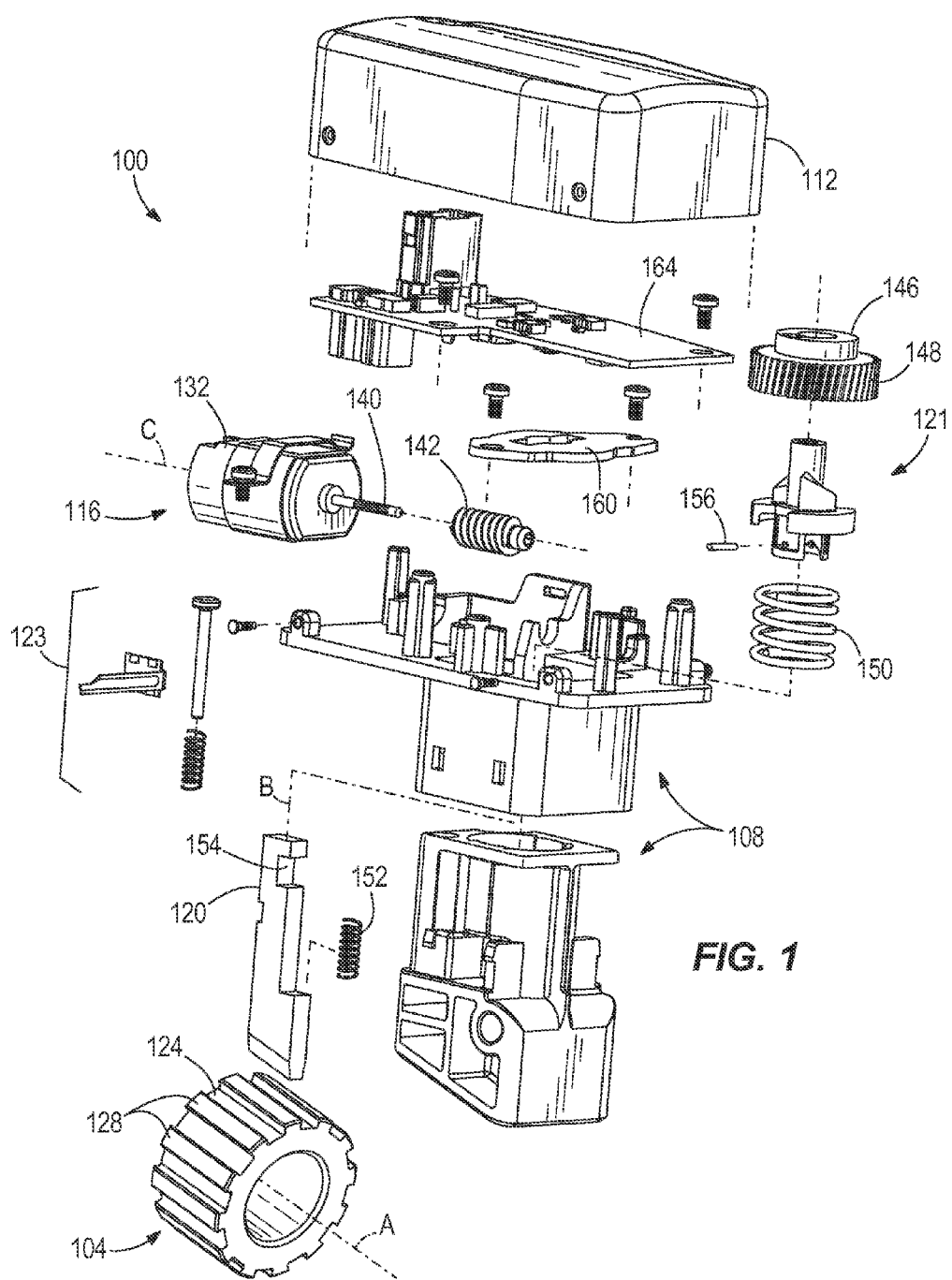
FIG. 1 is an exploded assembly view of a steering lock.
Figure 2:
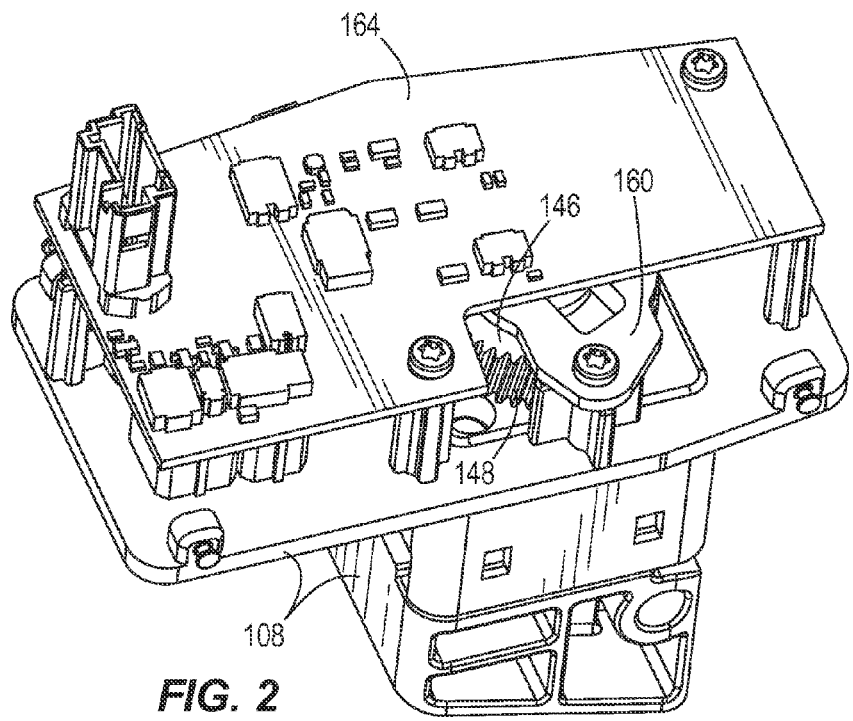
FIG. 2 is a perspective view of the steering lock of FIG. 1, with a cover removed.
Figure 3:
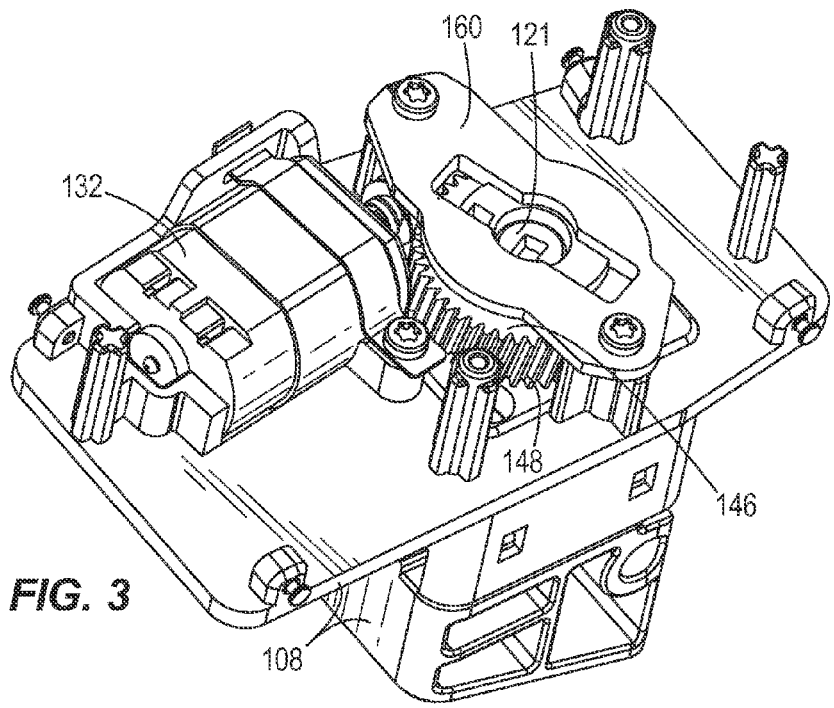
FIG. 3 is a perspective view of the steering lock of FIG. 1, with a cover and PCB removed.

FIGS. 1 and 2 illustrate a steering lock 100 operable to selectively lock an adjacent steering member 104 against rotation about its axis A. The steering lock 100 includes a housing 108 that is mounted at a predetermined location proximate the steering member 104. As shown, the housing 108 can include multiple joinable portions or members such as a main housing and lockbolt guide, but other constructions are optional. A cover 112 is removably coupled to the housing 108 to enclose an actuation device 116 of the steering lock 100. The actuation device 116, discussed in further detail below, includes a lockbolt 120 that is movable between a steering member-locking position or simply "locked" position and a steering member-unlocking position or simply "unlocked" position. In the illustrated construction, the lockbolt 120 is movable between the locked and unlocked positions along an axis B that is substantially perpendicular to the axis A of the steering member 104. An anti-tamper locking device 123 is provided to prevent the lockbolt 120 from moving to the unlocked position in the event of breakage or tampering with the housing 108.

As shown in FIG. 1, the ring-shaped steering member 104 includes a plurality of notches or grooves 124 that are elongated parallel to the axis A. Each adjacent pair of grooves 124 are separated by a rib 128. When the steering lock 100 is locked, a distal end of the lockbolt 120 is positioned within one of the grooves 124, and interference between the lockbolt 120 and the two adjacent ribs 128 prevent substantial rotation of the steering member 104 about the axis A. The size, shape, and number of the grooves 124 and the ribs 128 can be varied from the illustrated construction according to the needs of a particular application. Although limited rotation of the steering member 104 may be possible in some circumstances when locked by the steering lock 100, the steering mechanism (e.g., steering wheel, handlebars, etc.) to which the steering member 104 is coupled is rendered unusable for normal operation of the vehicle on which the steering lock 100 is provided.

The actuation device 116 includes an actuator 132 in addition to the lockbolt 120. The actuator 132 of the illustrated construction is an electric motor powered by supplying electrical current via an electrical circuit, although other types of actuators (e.g., powered mechanically or fluidly) may be used. The actuator 132 includes an output shaft 140. In the illustrated construction, the output shaft 140 is secured in driving relationship with a primary driving member 142 such as a screw-like gear or "worm" rotatable about an axis C defined by the actuator 132.

Although the output shaft 140 is provided as a direct rotary drive member extending directly from the actuator 132, a power transmission device such as a gear train having one or more gears that alter the torque and speed may be provided. In such constructions, the primary driving member 142 may have an axis that is different from the axis of the actuator 132, and may be linearly offset or angled relative thereto. Such an arrangement may not only provide a desired gear ratio but also a desired orientation of components (e.g., for more efficient packaging, etc.).

Figure 4:
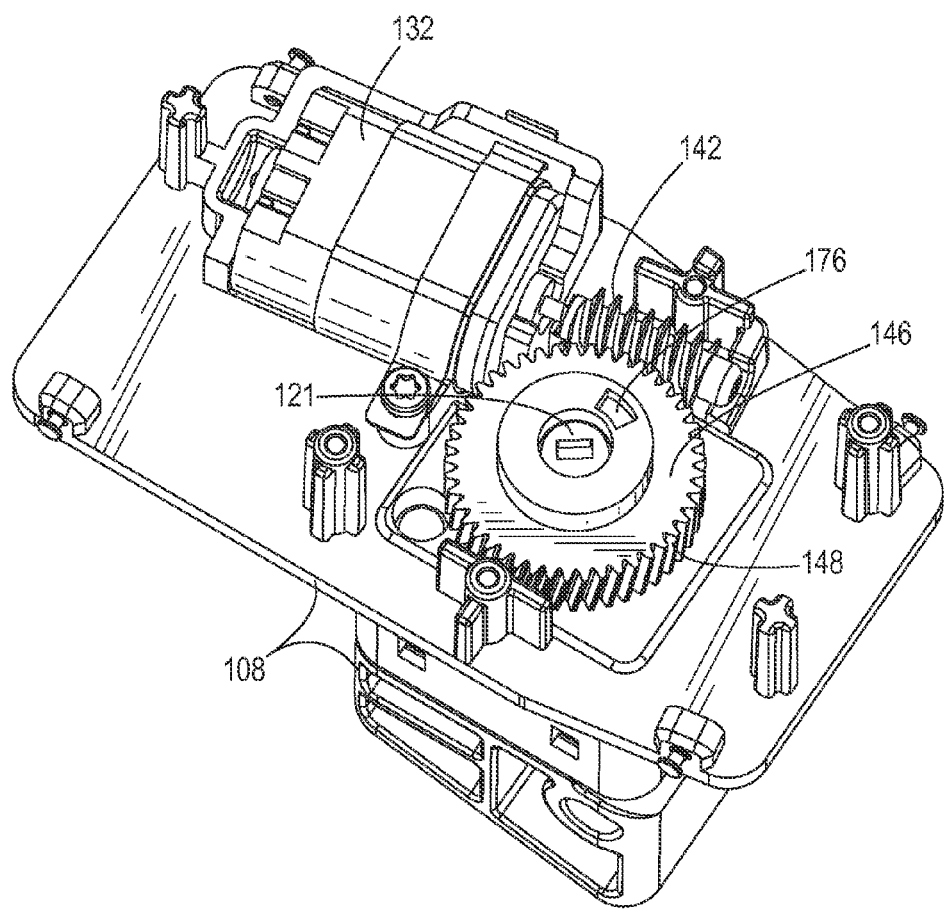
FIG. 4 is a perspective view of the steering lock of FIG. 1, with a cover, PCB, and bracket removed.
Figure 5:
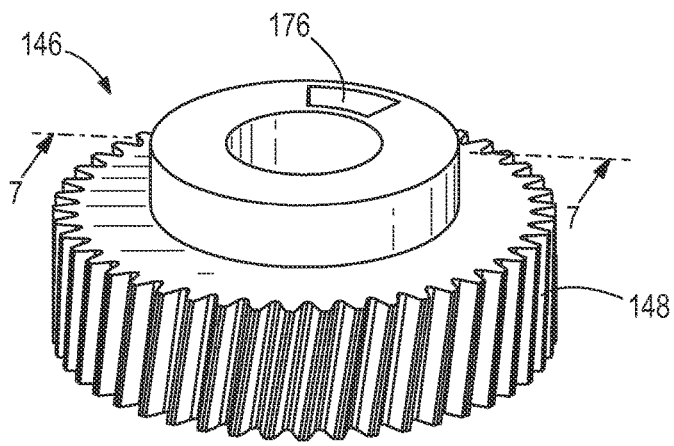
FIG. 5 is a perspective view of a driver of the steering lock of FIG. 1.
Figure 10:
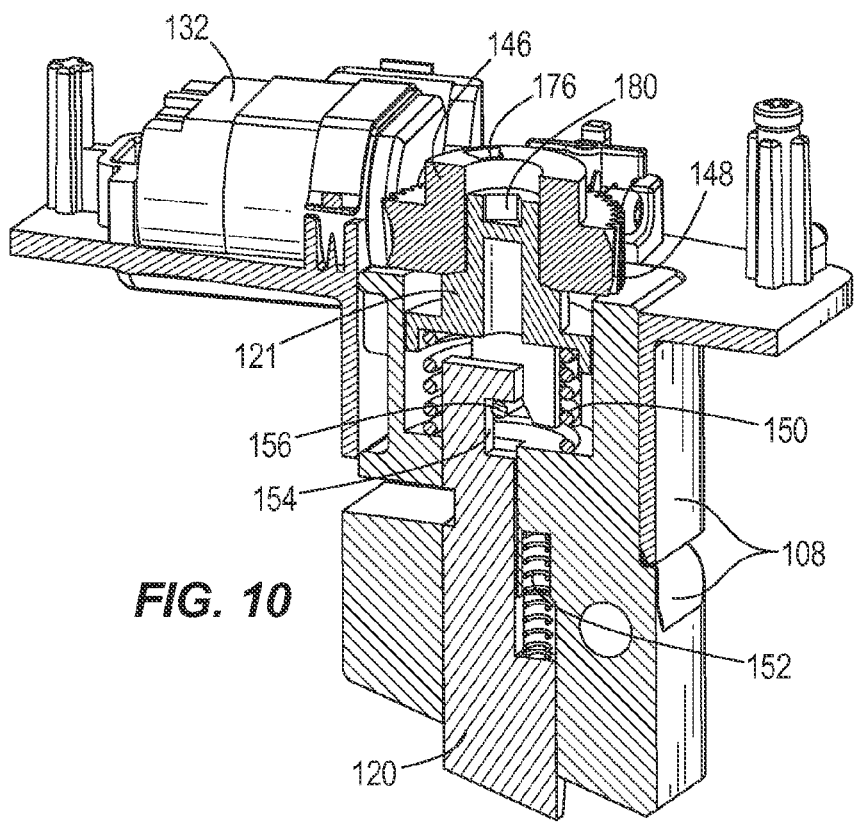
Figure 11:
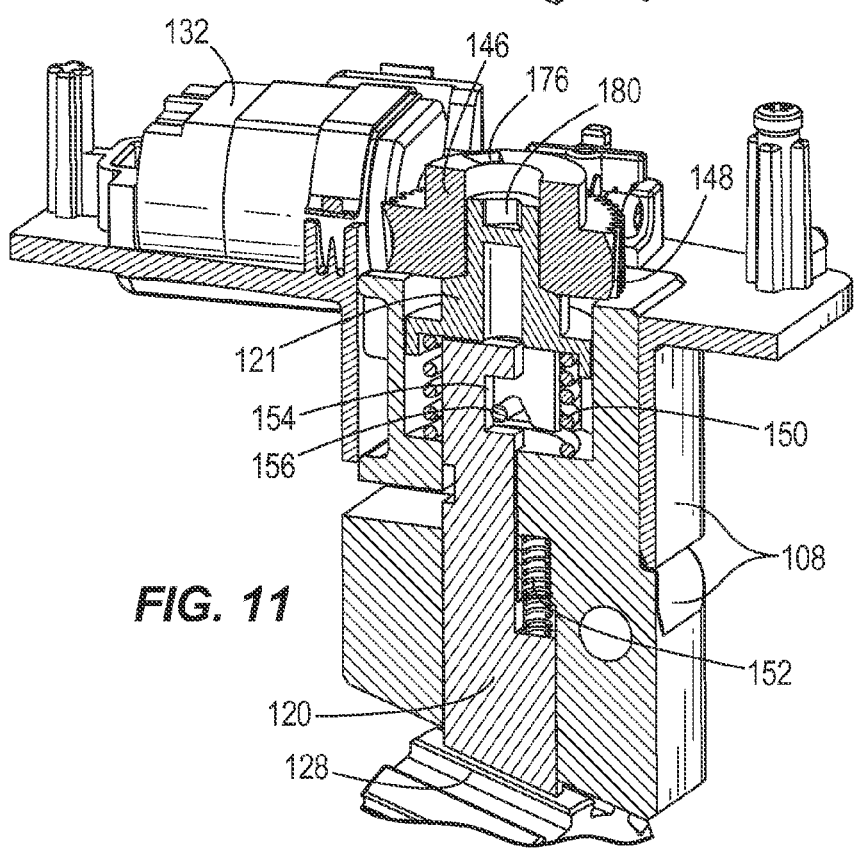

As shown in FIG. 4, the primary driving member 142 is engaged with a secondary driving member 146, which includes gear teeth 148 at its outer periphery for establishing the driving relationship with the primary driving member 142. For example, the illustrated secondary driving member 146 is a worm gear engaged with the worm 142. The secondary driving member 146 is also engaged with a lockbolt carrier 121 (FIG. 6), which moves back and forth with the lockbolt 120 and transmits forces to the lockbolt 120 to move the lockbolt 120 between the locked and unlocked positions. As discussed in further detail below, the secondary driving member 146 can rotate in place about the lockbolt axis B or a parallel axis, and the lockbolt carrier 121 is constrained against rotation about the axis B so that it translates along the axis B in conjunction with rotation of the secondary driving member 146. A first biasing member 150 (e.g., coil spring shown in FIGS. 8-11, or other type of spring having biasing properties) is positioned between the lockbolt carrier 121 and the housing 108 to bias the lockbolt carrier 121 along the axis B in a direction of the unlocked position of the lockbolt 120 (e.g., a direction away from the axis A of the steering member 104). The lockbolt carrier 121 can include a retaining portion or flange 127 for receiving a portion of the first biasing member 150. As illustrated, the flange 127 can be segmented into multiple portions. A second biasing member 152 (e.g., a coil spring, or other type of spring having biasing properties) weaker than the first biasing member 150 is positioned between the lockbolt 120 and the housing 108. The second biasing member 152 is configured to deflect (e.g., compress) as the lockbolt 120 moves from the locked position to the unlocked position and to have a maximum deflection amount corresponding to a maximum stored energy amount when the lockbolt 120 is in the unlocked position (the second biasing member 152 may have a minimal amount of pre-load when the lockbolt 120 is in the locked position). Thus, when the first biasing member 150 is not applying a force to the lockbolt 120 in the unlocking direction, the second biasing member 152 biases the lockbolt 120 to the locked position. This occurs in the event that the lockbolt carrier 121 is actuated to move to the locked position and the lockbolt 120 is in a "deadhead" condition in which it is prevented from seating into a groove 124 of the steering member, but rather is aligned with one of the ribs 128. This is shown in FIG. 11. The second biasing member 152 can also be positioned between the lockbolt 120 and the lockbolt carrier 121 in other constructions. The second biasing member 152 provides a force that moves the lockbolt 120 into the locked position as soon as the steering member 104 is rotated to remove the interference. Aside from this condition, the lockbolt 120 and the lockbolt carrier 121 are secured or coupled together to move as a unit along the axis B.

Figure 6:
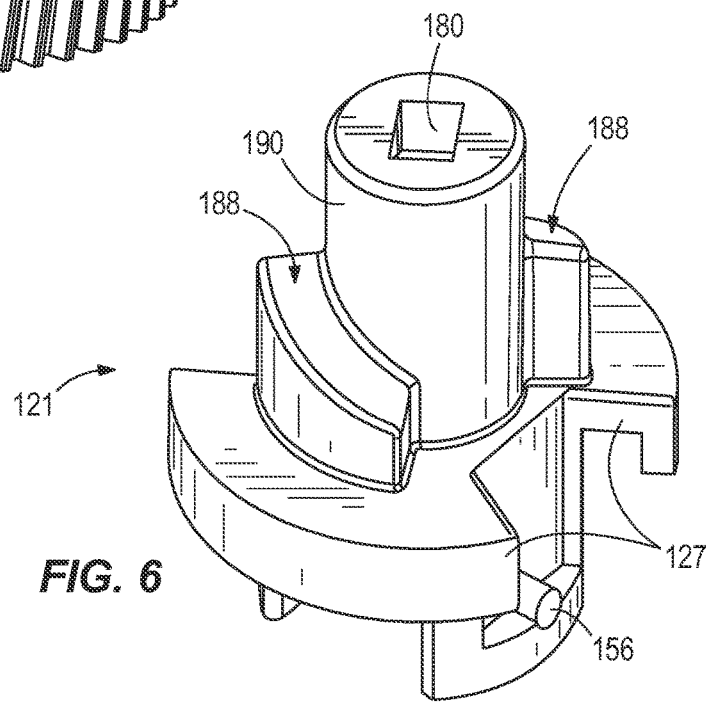
FIG. 6 is a perspective view of a lockbolt carrier of the steering lock of FIG. 1.
Figure 6A:
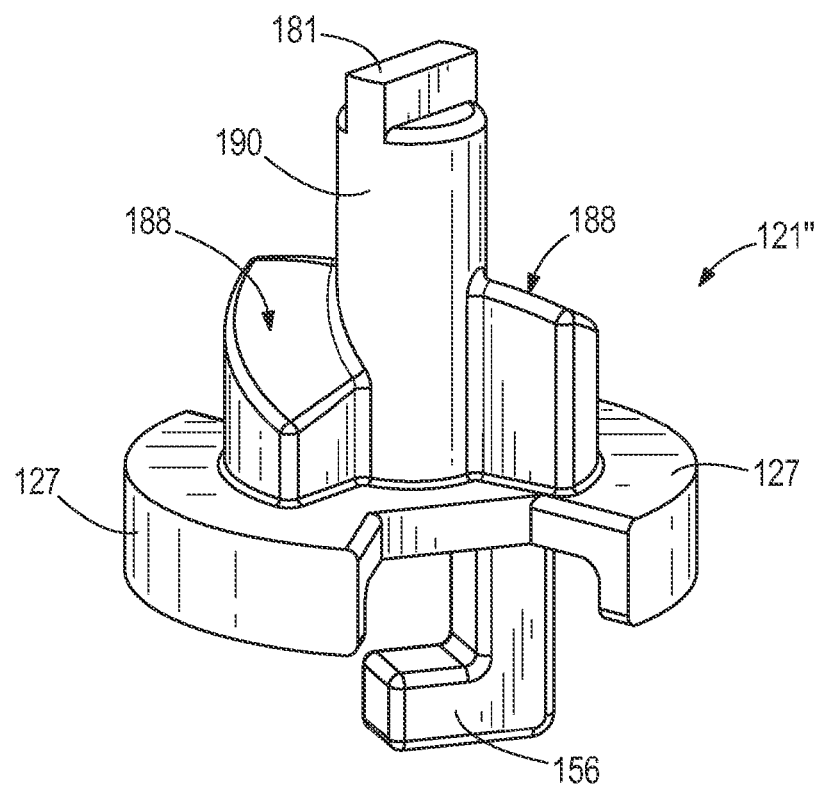
FIGS. 6A and 6B are perspective views of an alternate lockbolt carrier for the steering lock of FIG. 1.
Figure 6B:
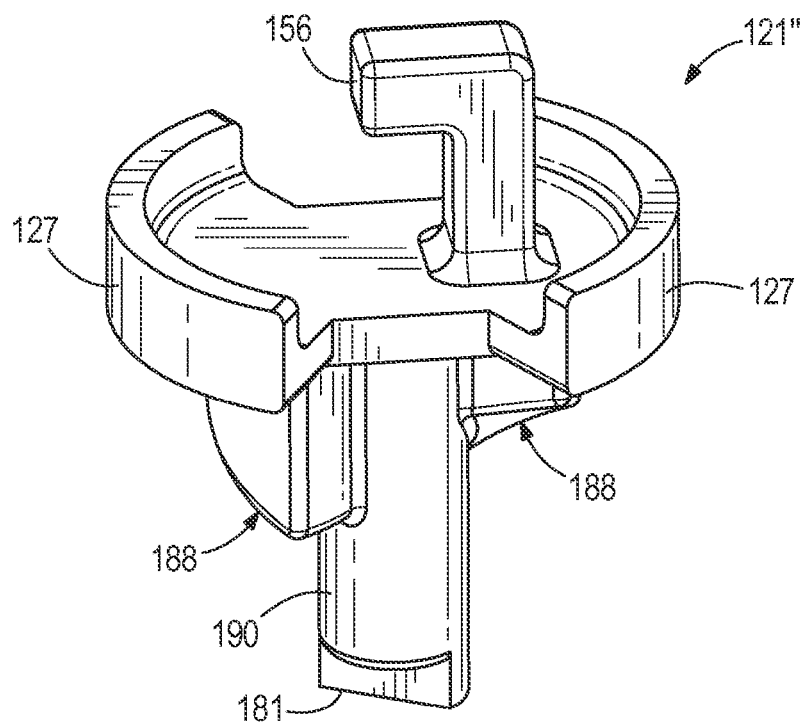
Figure 8:
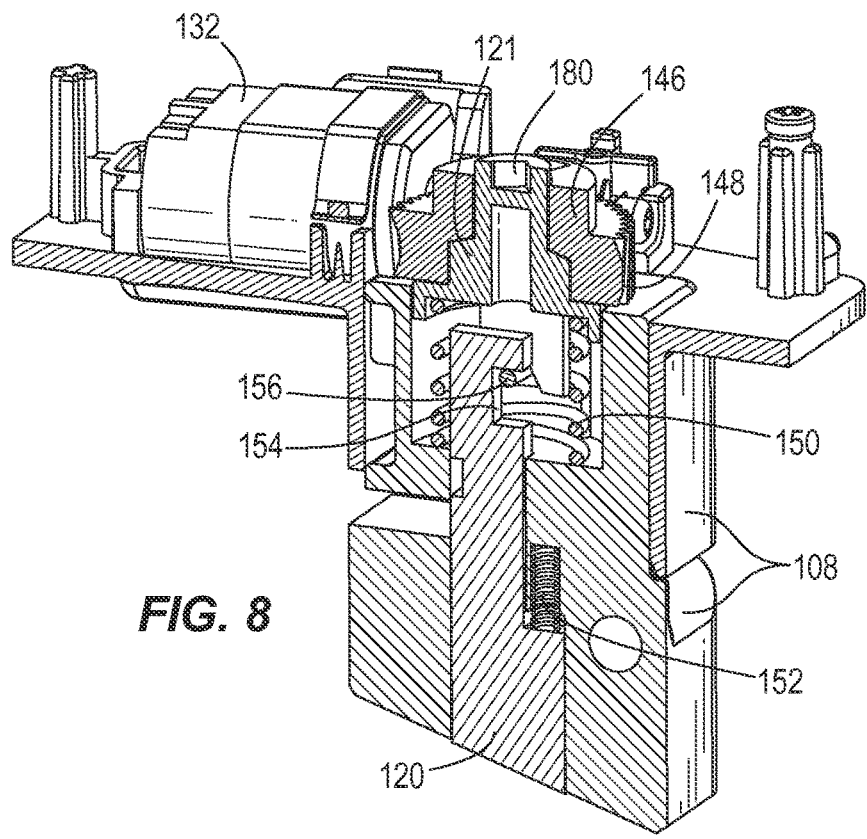
FIGS. 8-11 are cross-sectional views of the steering lock of FIG. 1 in various operational positions.

The lockbolt carrier 121 can engage a slot 154 formed in the lockbolt 120, which is oversized in the direction of the lockbolt axis B for a corresponding engagement portion 156 of the carrier 121. The engagement portion 156 can be a pin portion formed integrally with the lockbolt carrier 121 or fixed (e.g., press-fit) thereto as shown in FIGS. 6 and 8-11. In other constructions, the engagement portion 156 can be a hook portion as shown in FIGS. 6A, 6B, 13-15, and 18-19. In FIGS. 6A and 6B, a lockbolt carrier 121" having an open hook type engagement portion 156 is shown. The lockbolt carrier 121" also includes a fin or rib 181 at an axial end opposite the hook portion 156. The fin or rib 181 can be operably sensed or detected by an optical light-gate (not shown) to detect the position of the carrier 121". In FIGS. 13-15 and 18-19, a lockbolt carrier 121' having a closed hook type engagement portion 156 is shown. In this construction, the hook portion is bounded on three lateral sides and is open to one lateral side.

Figure 12:
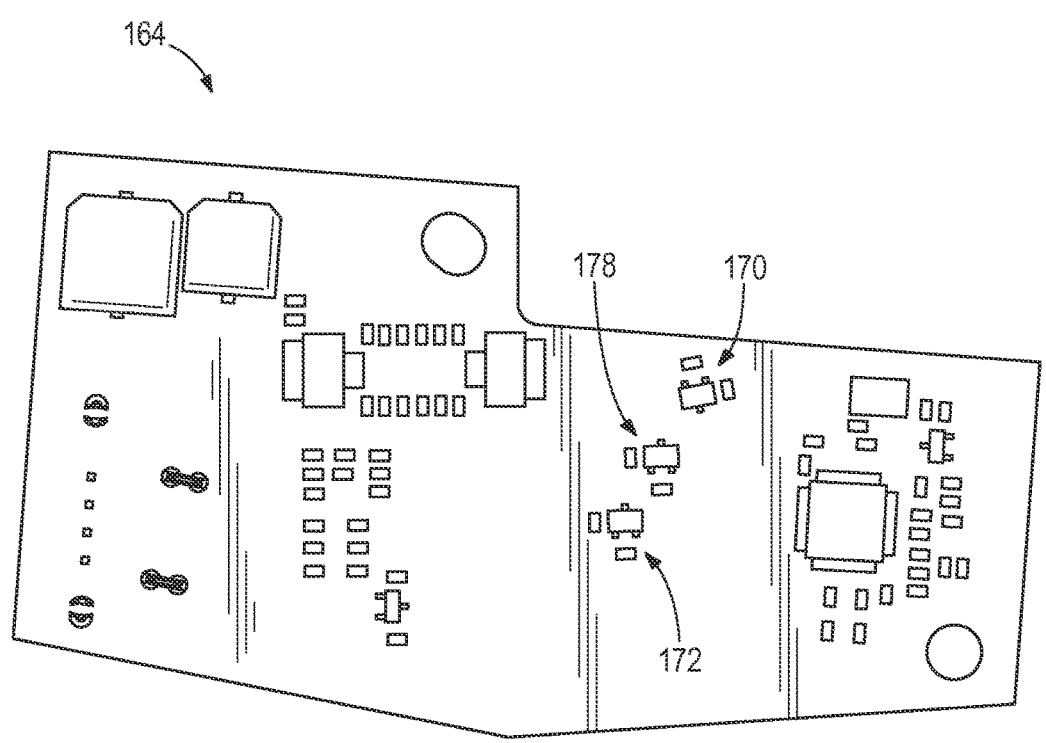
FIG. 12 is a front view of the PCB of the steering lock of FIG. 1.
Figure 16:
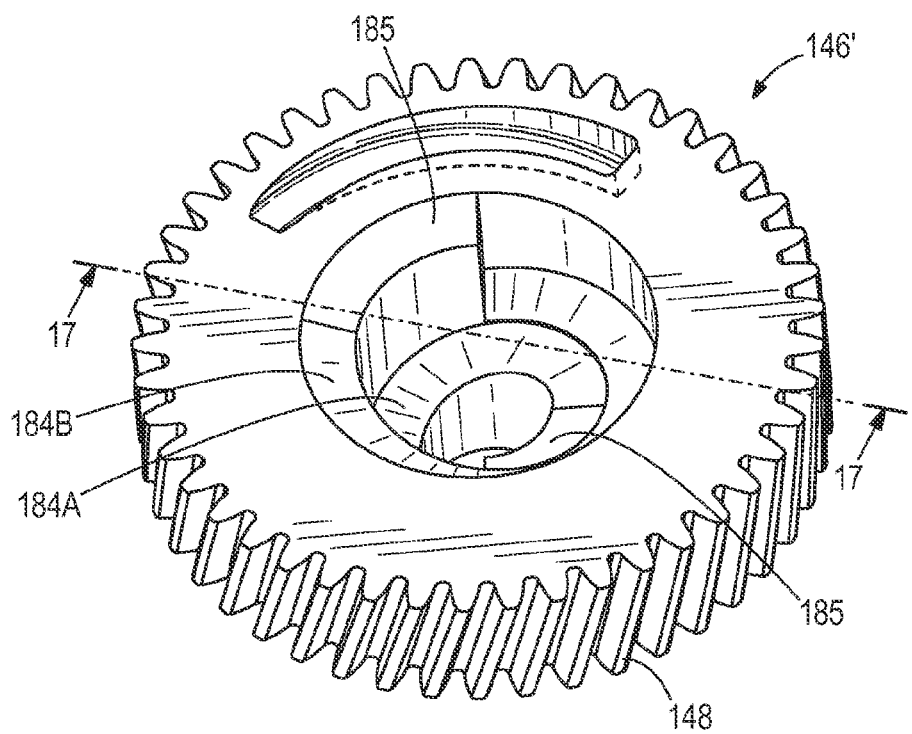
FIG. 16 is a perspective view of a driver of the lockbolt actuation mechanism of FIGS. 13-15.
Figure 17:
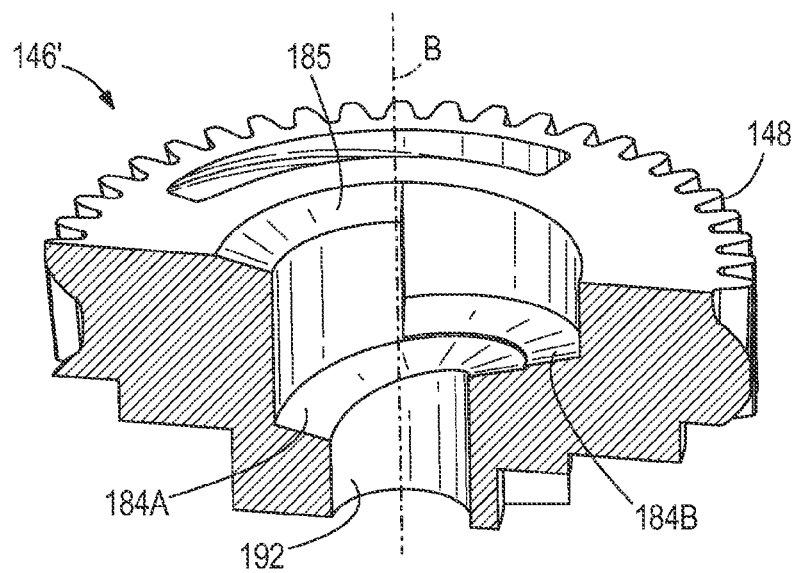
FIG. 17 is a cross-sectional view, taken along line 17-17 of the driver of FIG. 16.
Figure 18:
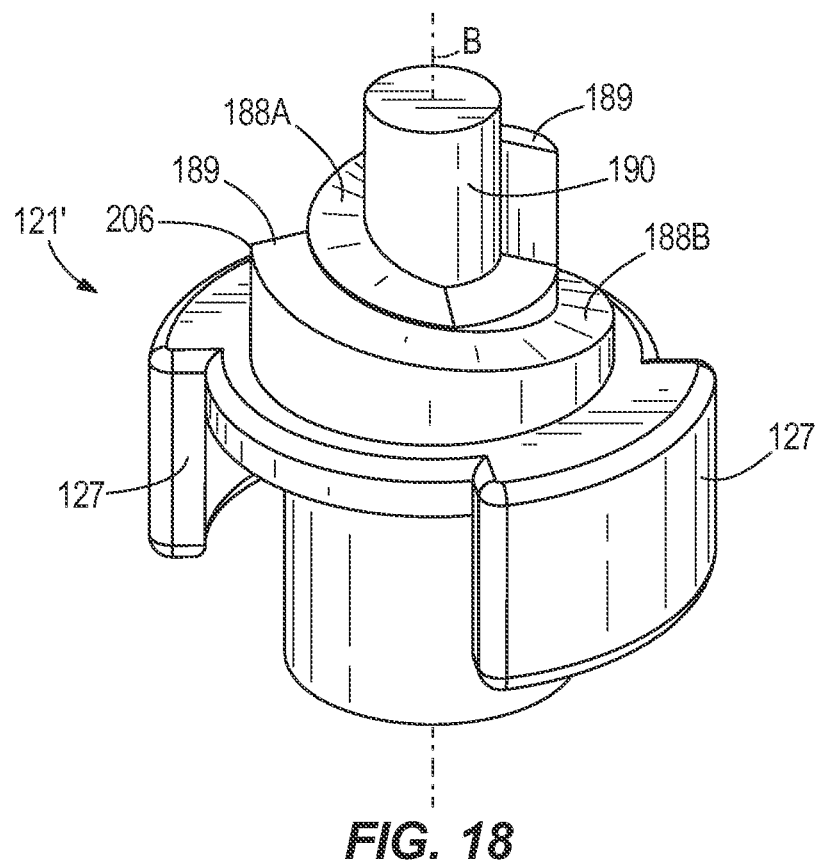
FIGS. 18, 18A, and 18B are perspective views of a lockbolt carrier of the lockbolt actuation mechanism of FIGS. 13-15.
Figure 19:
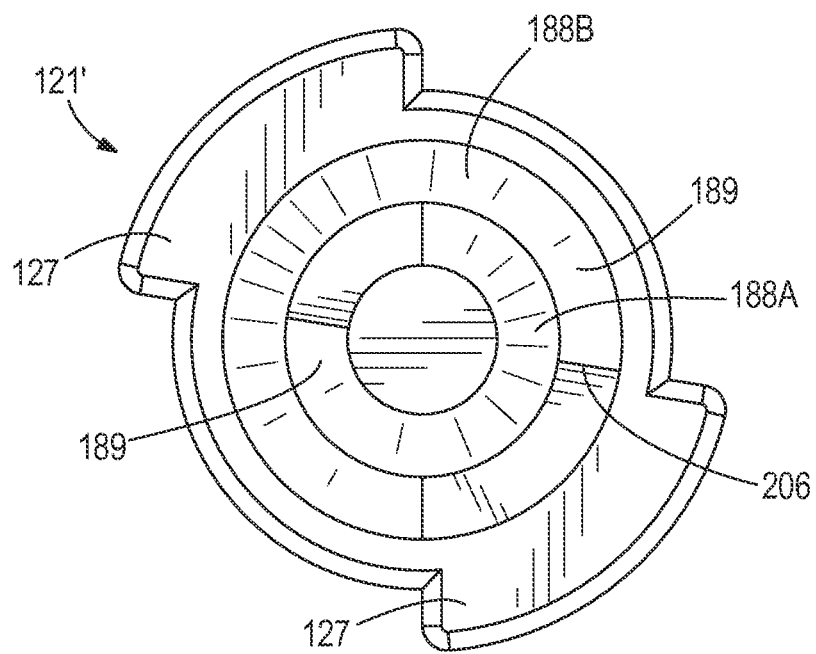
FIG. 19 is a top view of the lockbolt carrier of FIG. 18.
Figure 18A:
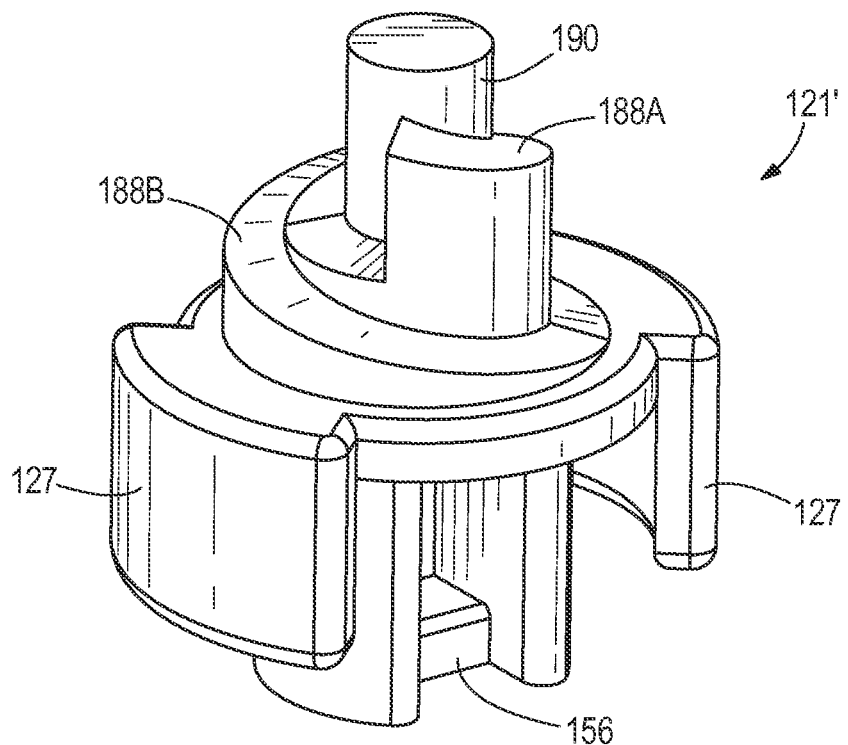
Figure 18B:
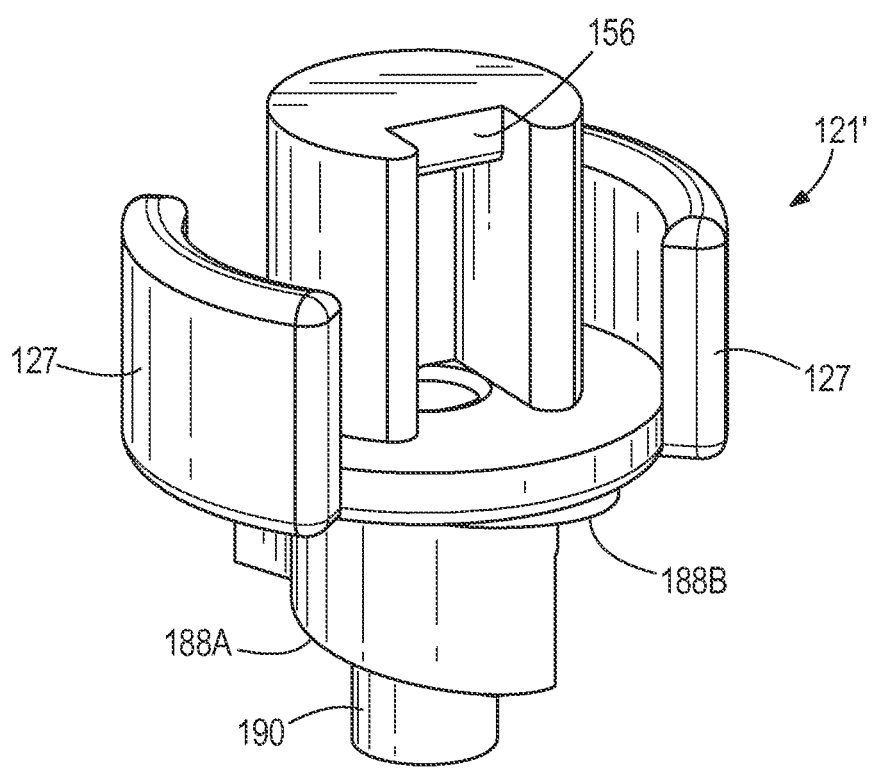

A bracket 160 is provided to secure the secondary driving member 146 in position relative to the housing 108. For example, the bracket 160 can extend over and across the secondary driving member 146 and be screwed to the housing 108 in multiple locations. The housing 108 may be formed (e.g., molded) to include one or more cradles for supporting the primary driving member 142. A printed circuit board (PCB) 164, shown in FIGS. 1, 2 and 12, is positioned within the cover 112 and secured relative to the housing 108 alongside the actuation device 116. The PCB 164 can include a controller configured to control the operation of the actuator 132. The controller may also be configured to determine the angular position of the secondary driving member 146 about the axis B based on one or more position sensors and to shut off the actuator 132 upon receiving an appropriate signal from the position sensor(s). In the illustrated construction, the position sensors can include two Hall-effect sensors 170, 172 operable to detect a magnet portion 176 of the secondary driving member 146. An additional sensor (e.g., Hall-effect sensor) 178, or "lockbolt sensor" is provided on the PCB 164 and configured to sense a position of the lockbolt 120 along the axis B. More precisely, the lockbolt sensor 178 is operable to detect whether or not the lockbolt carrier 121 is in the unlocked position. For this purpose, the lockbolt carrier 121 includes a magnet portion 180 (as shown in FIG. 6).

Figure 7:
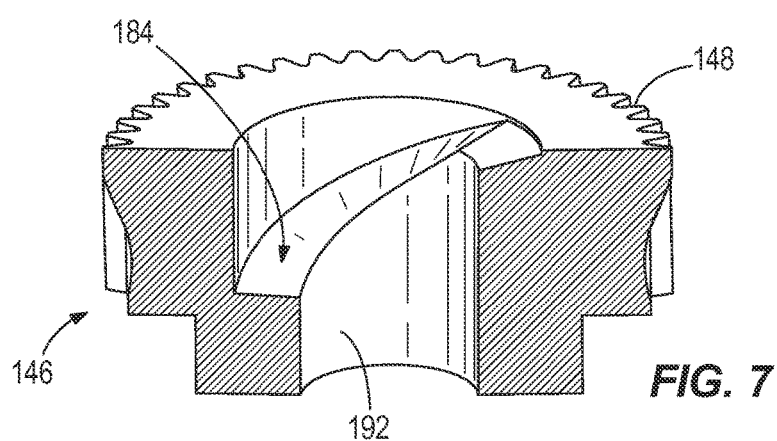
FIG. 7 is a cross-sectional view of the driver, taken along line 7-7 of FIG. 5.

The secondary driving member 146 and the lockbolt carrier 121 are provided with a driving interface which enables the secondary driving member 146 to drive the lockbolt carrier 121 in a locking direction against the bias of the first biasing member 150, but does not enable the secondary driving member 146 to actuate or "pull" the lockbolt carrier 121 in the opposite, unlocking direction along the axis B. Thus, the driving interface can be described as push-only. For example, a cam or ramp interface is provided by facing surfaces of the secondary driving member 146 and the lockbolt carrier 121, which in some constructions include a pair of axial cam surfaces 184 of the secondary driving member 146 (one of the cam surfaces 184 shown in FIG. 7) and a pair of complementary axial cam surfaces 188 of the lockbolt carrier 121 (FIG. 6). As shown, each of the cam surfaces 184, 188 spans an arc of about 90 degrees. As such, the two cam surfaces 184 of the secondary driving member 146 are separated by non-ramped surfaces, and a gap exists between the two cam surfaces 188 of the lockbolt carrier 121. The cam surfaces 184, 188 can have helical or modified helical profiles. As illustrated, at least a portion of the lockbolt carrier 121 can nest within a portion of the secondary driving member 146. In particular, a central cylindrical portion 190 of the lockbolt carrier 121 can be received by a central bore 192 formed in the secondary driving member 146. This allows for a more compact mechanism.

In operation, the actuator 132 is controlled to operate in two opposite directions to control the state of the steering lock 100, between the locked and unlocked positions of the lockbolt 120. The steering lock 100 is kept in the unlocked state (FIG. 8) during normal operation of the vehicle. In this manner, the steering member 104 can rotate freely about its axis A without obstruction from the lockbolt 120. Upon being commanded by the operator or automatically by a predetermined function of the vehicle's security system, the steering lock 100 can be moved to the locked state (FIG. 10). To lock, the controller sends a lock signal to the actuator 132, which causes the actuator 132 to be driven in a first direction resulting in a driving force transmitted from the cam surfaces 184 to the cam surfaces 188 of the lockbolt carrier 121. The actuator 132 can be stopped upon operation for a predetermined amount of time, number of pulses, or until a positional feedback signal is confirmed (e.g., from the Hall-effect sensor 170). Due to the engagement between the cam surfaces 184, 188, the lockbolt carrier 121 moves a predetermined amount along the axis B for a given amount of rotation of the secondary driving member 146 about the axis B. Thus, the first biasing member 150 is deflected to store a predetermined amount of potential energy. Contrary to most steering locks, the actuator 132 of the steering lock 100 is configured to perform substantial work during locking, rather than during unlocking. The first biasing member 150 is pre-loaded during locking for the purpose of supplying the entire unlocking force, or in some constructions, a majority portion of the unlocking force. The first biasing member 150 can have a predetermined amount of stored energy or pre-load (e.g., 150 N) when the steering lock 100 achieves the locked state. Although the carrier 121 is driven to compress the first biasing member 150, driving force may not be transmitted to the lockbolt 120 through the actuator 132 and the carrier 121 due to the slot 154 formed in the lockbolt 120. Rather, the carrier 121 deflects the first biasing member 150 and simultaneously relieves the obstruction or resistance provided against the release of stored energy in the second biasing member 152. The second biasing member 152 biases the lockbolt 120 to the locked position as the lockbolt carrier 121 moves axially toward the steering member 104. In the locked position, the first biasing member 150 continues to store potential energy which bears on the lockbolt carrier 121 to urge the lockbolt carrier 121 in the unlocking direction, and a corresponding backward rotation of the secondary driving member 146. However, backdriving of the secondary driving member 146 to the unlocked position by the first biasing member 150 can be prevented by flats or dwells on the cam surfaces 184, 188 and/or the mechanics of the engagement between the gear teeth 148 of the secondary driving member 146 and the primary driving member 142. In other words, the stored energy in the first biasing member is not sufficient for the secondary driving member 146 to drive the primary driving member 142 when the actuator 132 is at rest (i.e., de-energized).

The above description of how the actuation device 116 moves the lockbolt 120 to the locked position assumes that the lockbolt 120 is aligned with one of the notches 124 of the steering member 104 and not one of the intermediate ribs 128. However, there is a significant chance that, at the time that the actuator 132 is powered to move the steering lock 100 from the unlocked state to the locked state, the lockbolt 120 will be at least partially aligned with one of the ribs 128. In the event that the lockbolt 120 is aligned with one of the ribs 128 when actuated, the actuator 132 still actuates and moves the lockbolt carrier 121 just as it would if the lockbolt 120 were aligned with one of the notches 124. However, the movement of the lockbolt 120 is stopped prematurely and the second biasing member 152 remains deflected as shown in FIG. 11. This allows the lockbolt 120 to later move to the locked position without further powering the actuator 132. As soon as the steering member 104 is moved slightly to remove the obstructing rib 128 from the path of the lockbolt 120, the energy stored in the second biasing member 152 is released, driving the lockbolt 120 into the locked position. The first biasing member 150 has no effect on the lockbolt 120 due to the separation between the lockbolt slot 154 and the engagement portion 156 of the carrier 121.

To unlock, the controller sends an unlock signal to the actuator 132, which causes the actuator 132 to be driven in a second direction resulting in the cam surfaces 184 of the secondary driving member 146 being urged away from the cam surfaces 188 of the lockbolt carrier 121. The actuator 132 can be stopped upon operation for a predetermined amount of time, number of pulses, or until a positional feedback signal is confirmed (e.g., from the Hall-effect sensor 172). As the secondary driving member 146 rotates to the unlocked position, the first biasing member 150 urges the lockbolt carrier 121 to move in an unlocking direction away from the locked position while contact is maintained between the two sets of cam surfaces 184, 188. Thus, the first biasing member 150 provides the force to move the lockbolt 120 from the locked position and a smooth, controlled unlock of the lockbolt 120 is achieved, albeit very quick (e.g., less than 180 milliseconds). Although quick to elapse, the steering lock 100 provides a controlled unlocking action as the operation of the actuator 132 in the second direction continuously allows an increasing amount of release of the stored energy in the first biasing member 150 to move the lockbolt carrier 121 and the lockbolt 120. This controlled action is in contrast to an uncontrolled, instantaneous release of all the energy stored in the first biasing member 150, which would occur in the case of a trigger-type release mechanism. The rate at which the stored energy in the first biasing member 150 is released is controlled by the speed of operation of the actuator 132 throughout the unlocking stroke. In some constructions, the controlled release of the stored energy in the first biasing member 150 enables the cam surfaces 184, 188 to maintain contact throughout the movement of the lockbolt 120 from the locked position to the unlocked position.

The release of the first biasing member 150 is also used to deflect the second biasing member 152 during unlocking. Contrary to most steering locks, the actuator 132 of the steering lock 100 is not configured to perform substantial work during unlocking, and thus, power consumption and noise are minimized. Regardless of the amount of force necessary to extract the lockbolt 120 from the locked position to the unlocked position, the actuator 132 need only be energized an amount sufficient to rotate the secondary driving member 146 back to the unlocked position. The actuator 132 is not coupled to the lockbolt carrier 121 or the lockbolt 120 in a manner that facilitates pulling of the lockbolt 120 from the locked position to the unlocked position. Rather, rotation of the secondary driving member 146 simply releases the stored energy of the first biasing member 150 and enables the first biasing member 150 to apply the unlocking force.

Figure 9:
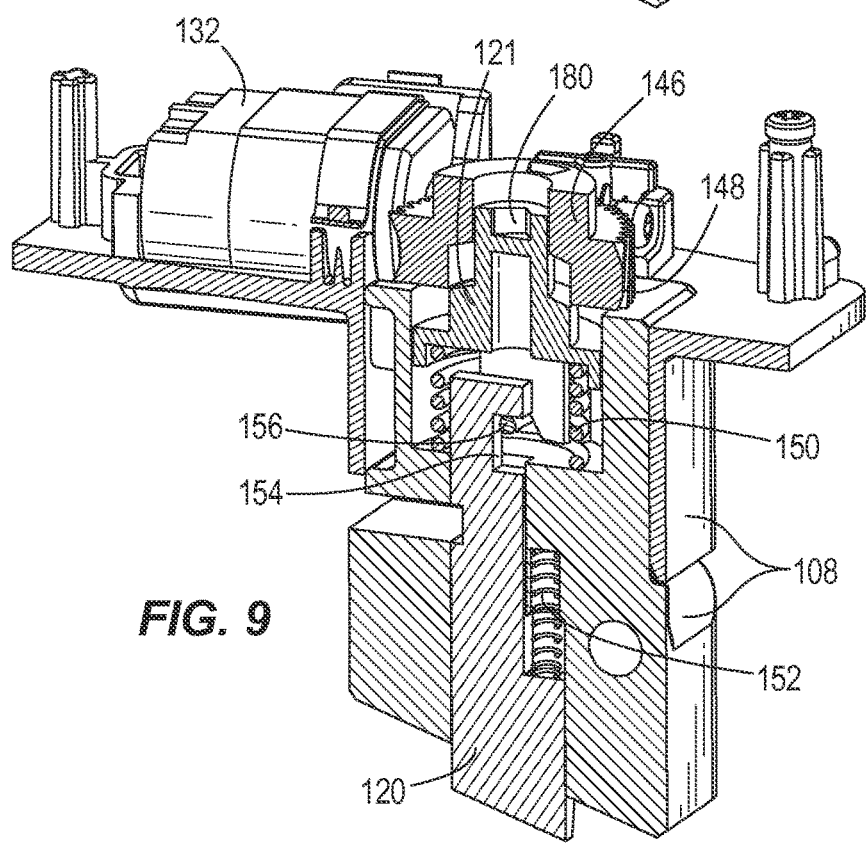

This is particularly relevant in consideration of a condition where one of the ribs 128 of the steering member 104 becomes wedged against the lockbolt 120 when the lockbolt 120 is in the locked position, referred to as a "torque lock" condition. For example, this may occur when one or more of the steerable wheels coupled to the steering member 104 are wedged against a stationary object, such as a curb. When a torque lock condition exists and it is desired to move the steering lock 100 from the locked state to the unlocked state, the actuator 132 operates normally to drive the secondary driving member 146 to the corresponding unlocked position, while the lockbolt 120 and the lockbolt carrier 121 may temporarily remain in the locked position as shown in FIG. 9. Just as with a normal unlocking process, the first biasing member 150 is relied upon to release the lockbolt 120 from the wedged condition. The steering lock 100 does not rely on the power supplied by the actuator 132 to extract or "unwedge" the lockbolt 120. In fact, as described above, the actuator 132 can provide "push-only" actuation of the lockbolt 120 (in the locking direction toward the locked position), and is not coupled to the lockbolt 120 or the carrier 121 in a manner that enables urging of the lockbolt 120 in the unlocking direction toward the unlocked position by the power of the actuator 132. Because the actuator 132 is not designed to extract the lockbolt 120 from a wedged condition, the controller does not need to be programmed with any actuation strategy for making multiple unlocking attempts nor be programmed to provide any increased power unlocking attempts, and in some constructions is programmed without such capability. In effect, as far as the controller, the actuator 132, and the secondary driving member 146 are concerned, every unlocking procedure is carried out identically. The controller may sense that the lockbolt carrier 121 has not reached the unlocked position (e.g., via sensor 178) although the secondary driving member 146 has reached its corresponding unlocked position. The controller may communicate with the vehicle operator, for example by an instrument panel or other display, to encourage the operator to operate the steering wheel in order to release the steering lock 100 from the locked state. This may be required in order for the controller of the steering lock 100 to send a signal to the vehicle controller which enables starting and/or driving of the vehicle.

For all unlocking scenarios that are not torque locked, the amount of unlocking force is always the same (i.e., the predetermined pre-load applied to the first biasing member 150 during locking), and is not dependent upon power supplied to the actuator 132 since the driving of the actuator 132 merely functions as an instrument to remove the interference of the secondary driving member 146 which prevents unlocking movement of the lockbolt 120 and lockbolt carrier 121. During these successful unlocking procedures, the maintained physical contact between the cam surfaces 184, 188 of the secondary driving member 146 and the lockbolt carrier 121 prevent impact loads or spring-release hammering between components of the actuation mechanism 116. In effect, the cam surfaces 184 of the secondary driving member 146, while not providing any driving input to the unlocking position, serve as a motion control device such that the lockbolt carrier 121 does not have free travel to snap to the unlocked position under the full pre-load of the first biasing member 150.

Due to the relatively strong bias force from the first biasing member 150, the second biasing member 152 can be substantially stronger than a conventional steering lock deadhead spring. As mentioned above, the second biasing member 152 is deflected in the unlocked position (when the stronger first biasing member 150 is allowed to unload as in FIG. 8) and the lockbolt 120 is driven by the second biasing member 152 to the locked position when the force of the first biasing member 150 is sufficiently removed from the lockbolt 120 by movement of the lockbolt carrier 121. Although the deflection of the second biasing member 152 during unlocking subtracts from the unlocking force provided by the first biasing member 150 to the lockbolt 120, the first biasing member 150 will overcome the second biasing member 152 and function to unlock the lockbolt 120 even when the spring constant of the second biasing member 152 is relatively high. In practice, a predetermined excess spring factor is provided between the pre-load of the first biasing member 150 (e.g., 150 N) in the locked position and the pre-load of the second biasing member 152 in the unlocked position to provide adequate unlocking force to the lockbolt 120 while also providing the second biasing member 152 to be stronger than conventional deadhead springs. For example, the second biasing member 152 may have a preload above 10 N, and in some cases even above 20 N or above 50 N, such as about 70 N. Because the second biasing member 152 is relied upon to prevent the lockbolt 120 from skipping or camming out of engagement with the steering member 104, the vastly stronger characteristic of the second biasing member 152 provides increased security of the steering lock 100 against unauthorized unlocking through torque applied to the steering member 104. On the other hand, if the second biasing member 152 is positioned between the lockbolt 120 and the carrier 121, the deflecting of the second biasing member 152 will contribute to the demand of the actuator 132 during locking when deadheading occurs, and thus, the total load must be considered when increasing the strength of the second biasing member 152.

FIGS. 16-21 illustrate alternate constructions of the secondary driving member 146' and the lockbolt carrier 121', which are identical to the components described above except as noted below or obvious from the drawings. Whereas the cam surfaces 184, 188 on each of the secondary driving member 146 and the lockbolt carrier 121 of the above described construction are provided as two identical circumferentially spaced surfaces, the secondary driving member 146' and the lockbolt carrier 121' of FIGS. 16-21 include cam surfaces that are circumferentially overlapping but radially separated. Particularly, the secondary driving member 146' includes a radially inner first cam surface 184A and a radially outer second cam surface 184B, and the lockbolt carrier 121' includes a radially inner first cam surface 188A engageable with the cam surface 184A and a radially outer second cam surface 188B engageable with the cam surface 184B. Each cam surface 184A, 184B, 188A, 188B can extend along an arc of about 180 degrees or more about the axis B, and the two cam surfaces on each component are provided 180 degrees out of sync or phase. In other constructions, other numbers of cam surfaces and other phase angles can be used (e.g., 3 cam surfaces 120 degrees out of sync or 4 cam surfaces 90 degrees out of sync). A dwell or flat portion 185, 189 is provided on each end of each cam surface 184A, 184B, 188A, 188B which correspond to the ends actively in engagement with each other when the secondary driving member 146' has actuated the lockbolt carrier 121' to the locked position. Thus, the first biasing member 150, which is pre-loaded by this locking actuation, does not impart any urging of the secondary driving member 146' back to the unlocked position.

Figure 20:
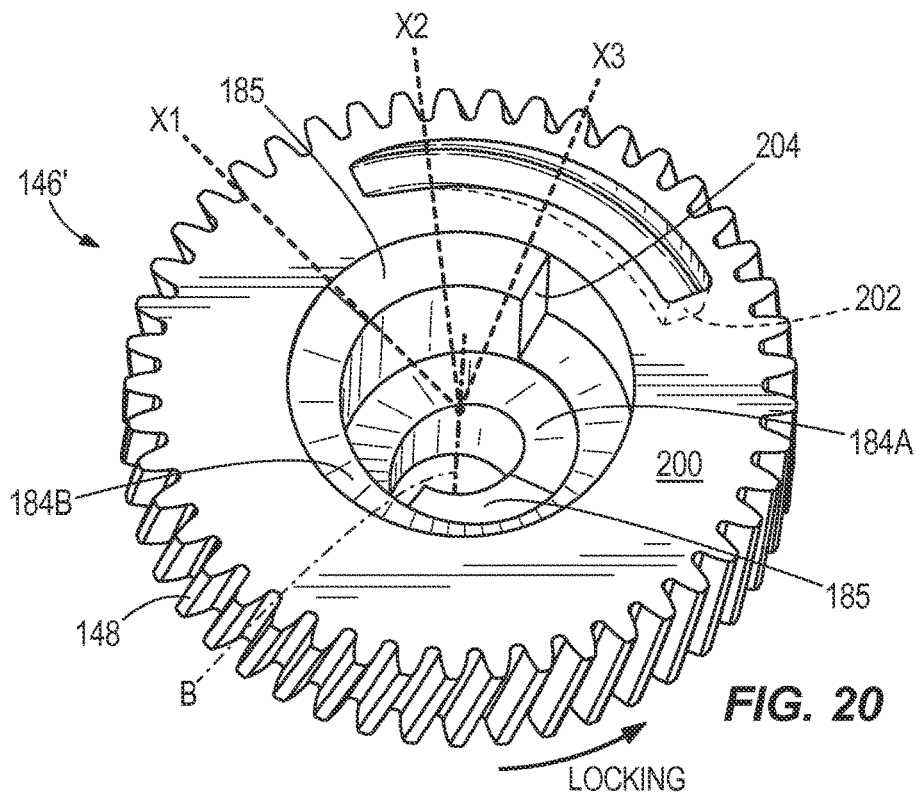
FIGS. 20 and 21 are perspective views of the driver of FIGS. 16 and 17, annotated to illustrate rotational sequences of actuation.
Figure 21:
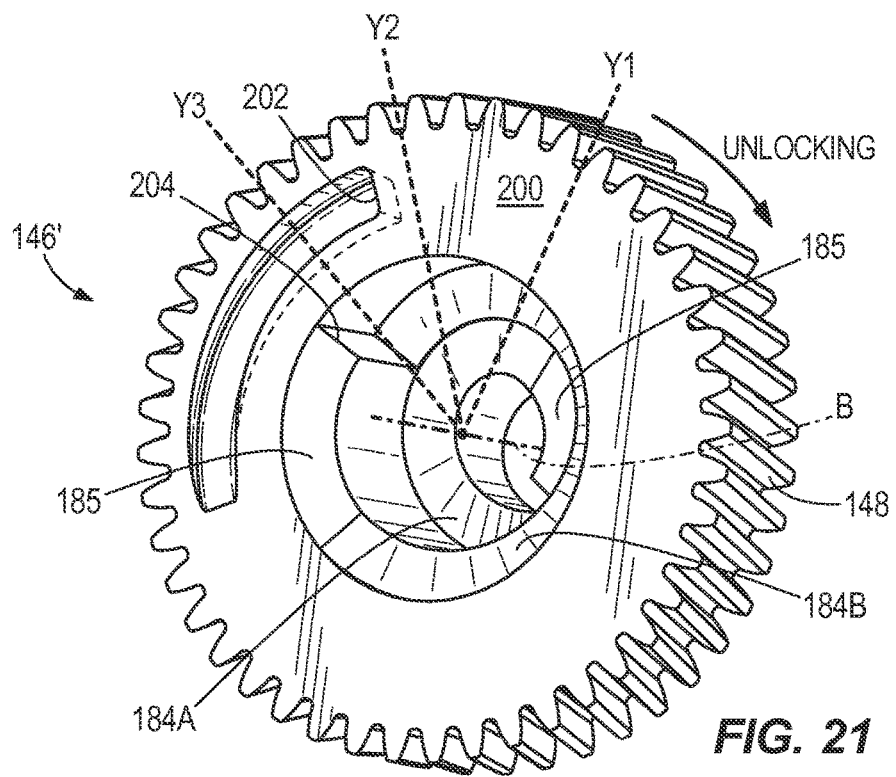

As noted in FIGS. 20 and 21, the actuator 132 can be configured to shut off at a position corresponding to the start of the engagement between the flat portions 185, 189 (i.e., as soon as the flat portions 185 begin to engage the flat portions 189 and rotation of the secondary driving member 146' no longer results in axial movement of the lockbolt carrier 121'). The rotational position X1 along the secondary driving member 146' designates the position at which the flat portions 189 reach the flat portions 185 as the actuator 132 rotates the secondary driving member 146' in the locking direction. The actuator 132 may then coast to a stop after driving the secondary driving member 146' by a further angle (where flat portions 189 reach the rotational position X2 along the secondary driving member 146'). At this position, engagement is maintained between the corresponding flat portions 185, 189. An axial face 200 of the secondary driving member 146' is provided with a stop 202 to limit any further travel of the secondary driving member 146' that would result in overtravel between the flat portions 185, 189 (i.e., the flat portions 189 reaching a position beyond the rotational position X3). The stop 202 (e.g., formed here as a terminal groove end) can abut a corresponding stop (e.g., formed as a protrusion) on the housing 108. The stop 202 is active for locking-direction rotation of the secondary driving member 146'. An additional stop 204 is provided on an interior of the secondary driving member 146' adjacent one of the cam surfaces 184A, 184B. In the illustrated construction, the stop 204 is provided on an axially extending end surface of the radially outer cam surface 184B, at the end of the flat portion 185. The stop 204 is positioned to interfere with or abut a corresponding stop 206 formed on the lockbolt carrier 121' (e.g., provided on an axially extending end surface of the radially outer cam surface 188B, at the end of the flat portion 189) to physically obstruct excess rotation of the secondary driving member 146'. As the secondary driving member 146' is moved in the unlocking direction (FIG. 21), the actuator 132 is configured to shut off before the secondary driving member 146' is driven to a point where the stop 204 engages the corresponding stop 206 of the lockbolt carrier 121'. The rotational position Y1 is designated as the point of the corresponding stop 206 along the secondary driving member 146' when the actuator 132 is shut off. The actuator 132 may then coast to a stop after driving the secondary driving member 146' by a further angle (where the stop 206 reaches the rotational position Y2 along the secondary driving member 146'). If excessive rotation occurs, the stop 204 prevents rotation of the stop 206 beyond rotational position Y3.

The invention claimed is:

1. A steering lock for selectively inhibiting rotation of a rotary steering member, the steering lock comprising:
a housing;
a lockbolt movable along a first axis between a steering member-locking position, in which a distal tip of the lockbolt is extended from the housing for engagement with the rotary steering member, and a steering member-unlocking position, in which the lockbolt is retracted with respect to the steering member-locking position;
an actuator;
a first member rotatable by the actuator in a first direction for movement of the lockbolt to the steering member-locking position, the first member having a first cam surface;
a second member having a second cam surface in engagement with the first cam surface of the first member, the second member being translatable along the first axis in a first, locking direction in response to rotation of the first member in the first direction; and
an unlocking spring compressible through a range of movement of the second member in the first direction to store increasing potential energy,
wherein the first and second cam surfaces are engaged such that movement of the lockbolt to the steering member-unlocking position is carried out by the stored energy in the unlocking spring, which is released in a continuously increasing manner controlled by the actuator as the first member is rotated by the actuator in a second direction opposite the first direction.

2. The steering lock of claim 1, wherein the engagement between the first and second cam surfaces defines a push-only interface incapable of pulling the second member with the first member to the unlocked position.

3. The steering lock of claim 1, further comprising a locking spring arranged to bias the lockbolt toward the steering member-locking position.

4. The steering lock of claim 1, further comprising a position sensor operable to detect a position of the first member, wherein the first member includes at least one magnet portion detectable by the position sensor.

5. The steering lock of claim 1, wherein the first member is provided with at least one stop operable to limit a range of rotation of the first member in the first direction or the second direction.

6. The steering lock of claim 5, wherein the first member is provided with a first stop engageable with a stop of the housing to limit rotation of the first member in one of the first direction or the second direction, and the first member is further provided with a second stop engageable with a stop of the second member to limit rotation of the first member in the other of the first direction and the second direction.

7. The steering lock of claim 1, wherein the first member is a worm gear including teeth engaged with an output worm of the actuator.

8. The steering lock of claim 1, wherein the first and second cam surfaces are complementary axially-facing cam surfaces.

9. The steering lock of claim 8, wherein the first and second cam surfaces are helically-shaped.

10. A steering lock for selectively inhibiting rotation of a rotary steering member, the steering lock comprising:
a housing;
a lockbolt movable along a first axis in a locking direction from a steering member-unlocking position, in which the lockbolt is retracted away from the rotary steering member to a steering member-locking position, in which a distal tip of the lockbolt is extended from the housing for engagement with the rotary steering member;
an actuator operable to rotate a worm;
a worm gear having teeth engaged with the worm such that the worm gear is rotatable by the actuator when powered, the worm gear having a first cam surface;
a carrier engaged with the lockbolt for movement with the lockbolt between the steering member-locking position and the steering member-unlocking position, the carrier having a second cam surface in engagement with the first cam surface of the worm gear such that the carrier is only drivable by the worm gear in the locking direction; and
an unlocking spring operable to maintain stored potential energy when in the steering member-locking position for moving the lockbolt to the steering member-unlocking position,
wherein the potential energy stored by the unlocking spring urges the carrier in an unlocking direction, and the engagement between the worm and the teeth of the worm gear resists the potential energy stored by the unlocking spring to hold the lockbolt in the steering member-locking position when the actuator is at rest.

11. The steering lock of claim 10, wherein potential energy is built up in the unlocking spring during movement of the carrier in the locking direction.

12. The steering lock of claim 10, wherein the unlocking spring is solely responsible for moving the lockbolt from the steering member-locking position to the steering member-unlocking position.

13. The steering lock of claim 10, wherein the engagement between the first and second cam surfaces defines a push-only interface incapable of pulling the carrier or the lockbolt with the actuator, the worm, and the worm gear to the unlocked position.

14. The steering lock of claim 10, further comprising a locking spring arranged to bias the lockbolt toward the steering member-locking position.

15. The steering lock of claim 10, further comprising a position sensor operable to detect a position of the worm gear, wherein the worm gear includes at least one magnet portion detectable by the position sensor.

16. The steering lock of claim 10, wherein the worm gear is provided with at least one stop operable to limit a range of rotation of the worm gear.

17. The steering lock of claim 16, wherein the worm gear is provided with a first stop engageable with a stop of the housing to limit rotation of the worm gear in one of a first direction or a second direction, and the worm gear is further provided with a second stop engageable with a stop of the carrier to limit rotation of the worm gear in the other of the first direction and the second direction.

18. The steering lock of claim 10, wherein the actuator is operable to rotate the worm in a first direction for locking, and wherein the actuator is operable to rotate the worm in a second direction for unlocking.

19. The steering lock of claim 10, wherein the first and second cam surfaces are complementary axially-facing cam surfaces.

20. The steering lock of claim 19, wherein the first and second cam surfaces are helically-shaped.

21. A steering lock for selectively inhibiting rotation of a rotary steering member, the steering lock comprising:
a housing;
a lockbolt movable along a first axis between a steering member-locking position, in which a distal tip of the lockbolt is extended from the housing for engagement with the rotary steering member, and a steering member-unlocking position, in which the lockbolt is retracted with respect to the steering member-locking position;
an actuator;
a first member rotatable by the actuator in a first direction for movement of the lockbolt to the steering member-locking position, the first member having a first cam surface;
a second member having a second cam surface in engagement with the first cam surface of the first member, the second member being translatable along the first axis in a first, locking direction in response to rotation of the first member in the first direction;
an unlocking spring compressible through a range of movement of the second member in the first direction to store increasing potential energy; and
a locking spring biasing the lockbolt in the locking direction,
wherein the lockbolt is movable by the bias of the locking spring from the steering member-unlocking position to the steering member-locking position as the second member compresses the unlocking spring during rotation of the first member in the first direction, and wherein the first and second cam surfaces are engaged such that movement of the lockbolt to the steering member-unlocking position is carried out by the stored energy in the unlocking spring, which is released in a continuously increasing manner controlled by the actuator as the first member is rotated by the actuator in a second direction opposite the first direction.

22. The steering lock of claim 21 wherein the engagement between the first and second cam surfaces defines a push-only interface incapable of pulling the second member with the first member to the unlocked position.

23. The steering lock of claim 21, further comprising a position sensor operable to detect a position of the first member, wherein the first member includes at least one magnet portion detectable by the position sensor.

24. The steering lock of claim 21, wherein the first member is provided with at least one stop operable to limit a range of rotation of the first member in the first direction or the second direction.

25. The steering lock of claim 24, wherein the first member is provided with a first stop engageable with a stop of the housing to limit rotation of the first member in one of the first direction or the second direction, and the first member is further provided with a second stop engageable with a stop of the second member to limit rotation of the first member in the other of the first direction and the second direction.

26. The steering lock of claim 21, wherein the first member is a worm gear including teeth engaged with an output worm of the actuator.

27. The steering lock of claim 21, wherein the first and second cam surfaces are complementary axially-facing cam surfaces.

28. The steering lock of claim 27, wherein the first and second cam surfaces are helically-shaped.

* * * * *